United States Patent
Poirier

(10) Patent No.: US 11,215,231 B2
(45) Date of Patent: Jan. 4, 2022

(54) BALL BEARING REAR INNER RING WITH OIL CIRCUMFERENTIAL GROOVE

(71) Applicant: PRATT & WHITNEY CANADA CORP., Longueuil (CA)

(72) Inventor: Cédric Poirier, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/849,340

(22) Filed: Apr. 15, 2020

(65) Prior Publication Data

US 2021/0324914 A1   Oct. 21, 2021

(51) Int. Cl.
    *F16C 33/66*   (2006.01)

(52) U.S. Cl.
    CPC ...... *F16C 33/6677* (2013.01); *F16C 33/6681* (2013.01)

(58) Field of Classification Search
    CPC ...... F16C 33/58; F16C 33/583; F16C 33/585; F16C 33/586; F16C 33/60; F16C 33/6651; F16C 33/6659; F16C 33/6677; F16C 33/6681; F16C 2360/23; F01D 25/125; F01D 25/18
    See application file for complete search history.

(56) References Cited

U.S. PATENT DOCUMENTS

| 4,194,797 A * | 3/1980 | Hormann ............ F16C 33/6677 |
| | | 29/898.066 |
| 4,334,720 A * | 6/1982 | Signer ..................... F16C 33/60 |
| | | 384/475 |
| 4,463,994 A * | 8/1984 | Eliason ............... F16C 33/6677 |
| | | 384/506 |
| 5,106,209 A | 4/1992 | Atkinson et al. |
| 10,145,418 B2 * | 12/2018 | Beauvais .............. F16C 19/225 |
| 10,174,635 B2 | 1/2019 | Walker et al. |
| 10,174,791 B2 * | 1/2019 | Beauvais ............. F16C 33/586 |
| 10,451,114 B1 * | 10/2019 | Farnum ................. F16C 33/586 |
| 2010/0086250 A1 * | 4/2010 | Evans ..................... F16C 33/64 |
| | | 384/571 |
| 2016/0025140 A1 * | 1/2016 | Walker ............... F16C 33/6677 |
| | | 384/475 |
| 2020/0362916 A1 * | 11/2020 | Poirier .................... F16C 19/06 |

* cited by examiner

*Primary Examiner* — Alan B Waits

(74) *Attorney, Agent, or Firm* — Norton Rose Fulbright Canada LLP

(57) ABSTRACT

An inner ring for a bearing assembly comprises an inner circumferential surface disposed between a first axial end and a second axial end. A circumferential slot is disposed in the inner circumferential surface adjacent the second axial end. At least one radial passage is disposed within the inner ring and is in fluid communication with the circumferential slot. At least one axial slot extends axially along the inner circumferential surface from a respective opening in the first axial end to the circumferential slot. At least one of the radial passage is circumferentially offset from each at least one axial slot.

20 Claims, 3 Drawing Sheets

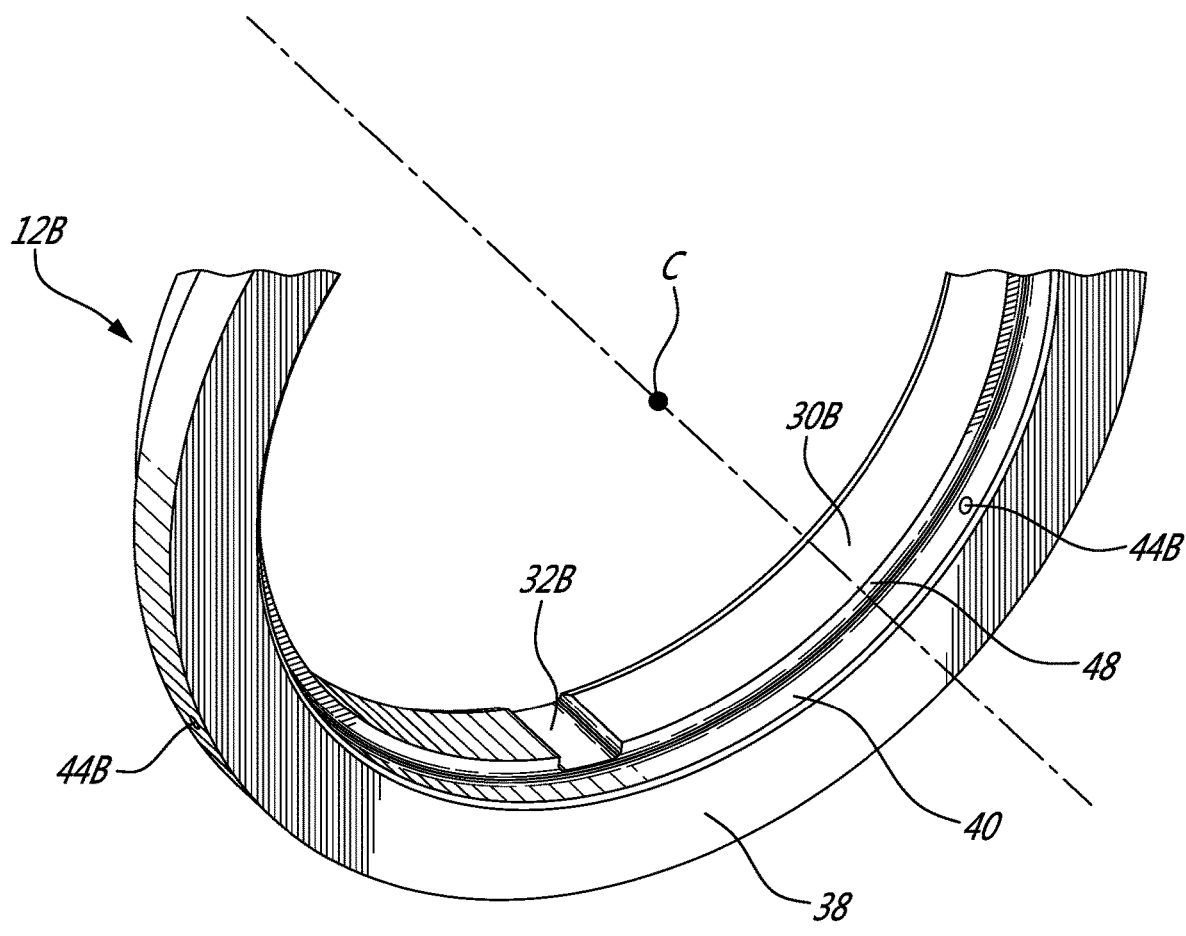

BALL BEARING REAR INNER RING WITH OIL CIRCUMFERENTIAL GROOVE

TECHNICAL FIELD

The application relates generally to ball bearing assemblies and, more particularly, to an inner ring for such an assembly.

BACKGROUND OF THE ART

To reduce wear on bearing assemblies such as those used in gas turbine engines, lubricating fluid such as oil is typically used to keep them cool and lubricate them. In particular, some of these bearing may be high-speed bearings, whereby adequate lubricating may increase their durability. Lubricating fluid may be delivered by being channeled under the bearing, for example through axial slots formed on an inside surface of an inner ring of the bearing assembly, with radial holes extending through the inner ring to intersect the axial slots. In ball bearings, the inner ring may be constituted of two inner rings, each with its own set of axial slots and radial holes directing the oil to the bearing features requiring lubrication, namely the front and rear lands and the raceway. Typical inner rings include radial holes disposed within the axial slots, which may increase the stress in the rings and limit operating conditions and potentially the lifespan of the bearing.

SUMMARY

In one aspect, there is provided an inner ring for a bearing assembly, comprising an inner circumferential surface disposed between a first axial end and a second axial end, a circumferential slot disposed in the inner circumferential surface adjacent the second axial end, at least one radial passage disposed within the inner ring and in fluid communication with the circumferential slot, and at least one axial slot extending axially along the inner circumferential surface from a respective opening in the first axial end to the circumferential slot, wherein at least one of the radial passage is circumferentially offset from each at least one axial slot.

In another aspect, there is provided a method of lubricating a bearing assembly, comprising feeding a lubricating fluid to at least one axial slot extending axially along the inner circumferential surface of an inner ring of the bearing assembly from a respective opening in a first axial end of the inner ring, directing the lubricating fluid to a circumferential slot disposed in the inner circumferential surface adjacent a second axial end of the inner ring, and circumferentially diverting at least a portion of the lubricating fluid into at least one radial passage disposed within the inner ring and circumferentially offset from each at least one axial slot, the at least one radial passage in fluid communication with the circumferential slot.

In a further aspect, there is provided a bearing assembly comprising an outer ring defining a central axis of rotation for the bearing assembly, an inner ring assembly disposed radially inwardly of the outer ring and cooperating therewith to form a roller volume, the inner ring assembly having a proximal inner ring, a distal inner ring, and a central circumferential slot in an inner circumferential surface of the inner ring assembly, the central circumferential slot being in fluid communication with the roller volume through central radial passages in the inner ring assembly, the proximal inner ring including proximal axial slots formed in, extending axially along and circumferentially spaced around a proximal portion of the inner circumferential surface, the proximal axial slots extending axially from openings in an axial face of the proximal inner ring to the central circumferential slot defined in the inner circumferential surface, at least one of the proximal axial slots being in fluid communication with the roller volume through a respective proximal radial passage in the proximal inner ring, and the distal inner ring including at least one distal axial slot formed in, extending axially along and circumferentially spaced around a distal portion of the inner circumferential surface, the distal inner ring further including a distal circumferential slot at a distal edge thereof, the distal circumferential slot being in fluid communication with the roller volume through at least one distal radial passage disposed in the distal inner ring, the at least one distal axial slot extending axially from the central circumferential slot to the distal circumferential slot, wherein at least one of the distal radial passage is circumferentially offset from each at least one distal axial slot, and bearing elements in the roller volume rollingly disposed against an inner circumferential surface of the outer ring and an outer circumferential surface of the inner ring, the ball bearing elements allowing relative rotational motion between the outer ring and the inner ring.

DESCRIPTION OF THE DRAWINGS

Reference is now made to the accompanying figures in which:

FIG. 3 is a perspective view of a distal inner ring for the bearing assembly of FIG. 1.

DETAILED DESCRIPTION

Figure 1:
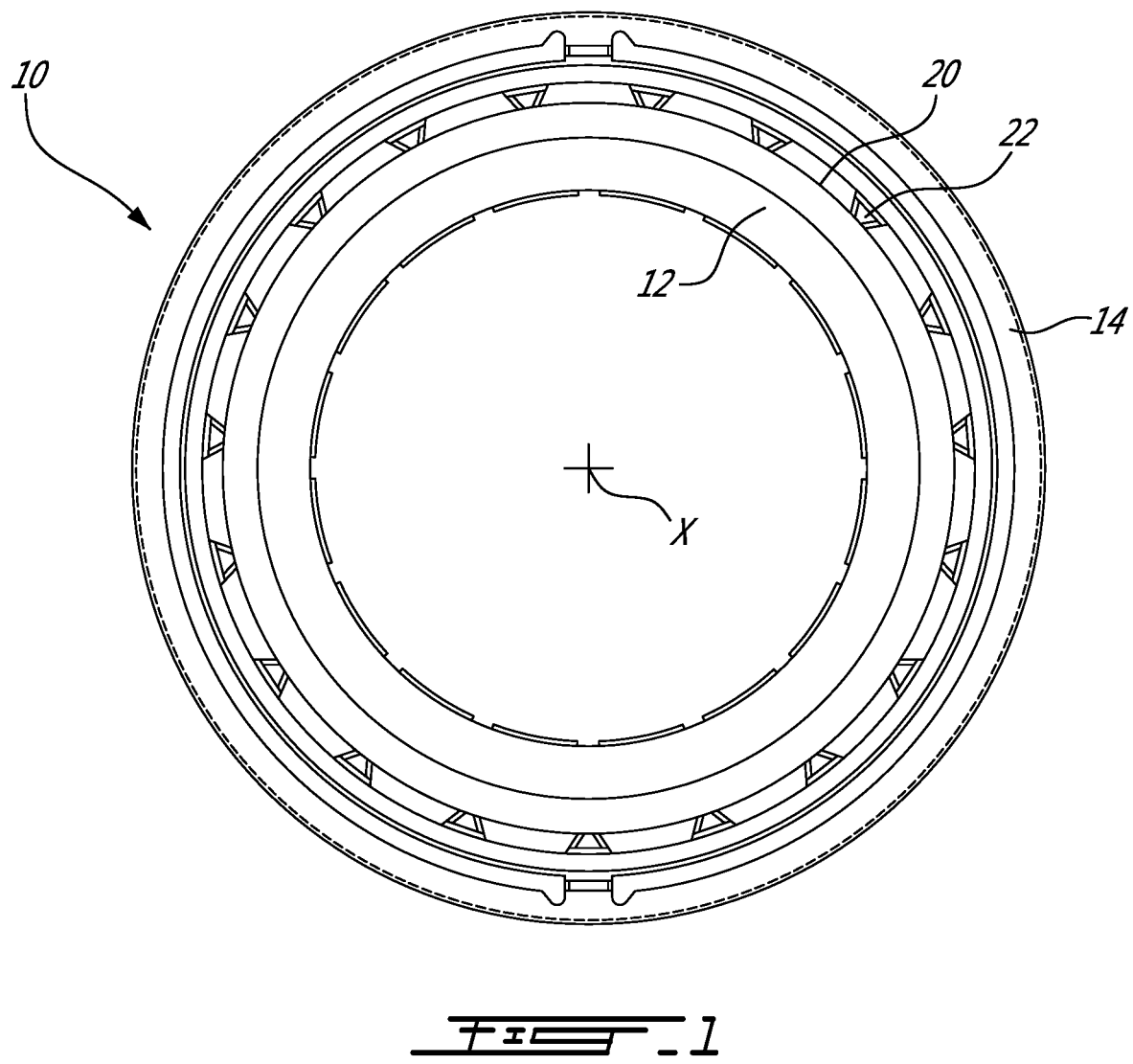
FIG. 1 is a schematic front view of a bearing assembly in accordance with a particular embodiment.
Figure 2:
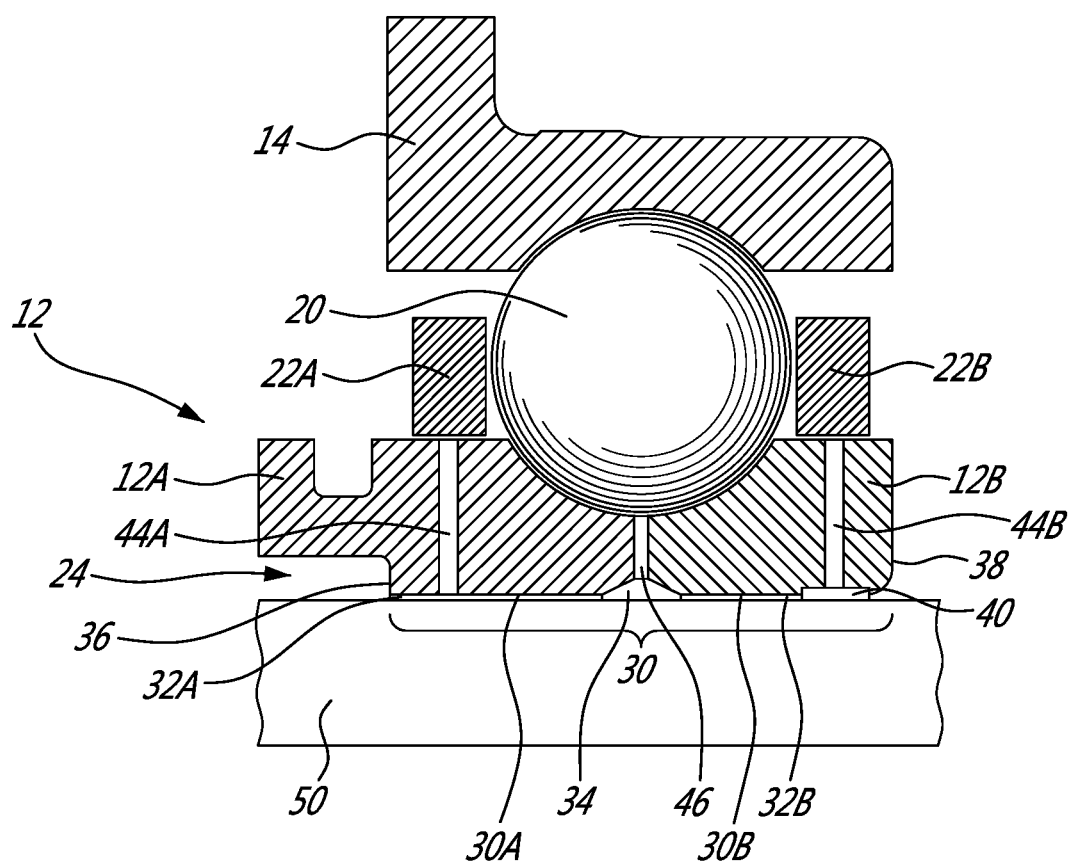
FIG. 2 is a schematic cross-section of part of the bearing assembly of FIG. 1.

Referring to FIGS. 1 and 2, a bearing assembly 10 in accordance with a particular embodiment is shown. According to an embodiment, the bearing assembly 10 is a high speed ball bearing, in that it may rotate in excess of 2.0 MDN (bearing bore diameter in millimeters times speed in rpm divided by one million), although it may be used in bearing assemblies operating at lesser speeds. The bearing assembly 10 generally includes a concentric inner ring assembly 12, consisting of a proximal inner ring 12A and a distal inner ring 12B, and outer ring 14 respectively defining concurrently a roller volume including inner and outer races in which a plurality of bearing elements 20 retained by an optional cage member 22 are received to allow relative rotation between the inner ring assembly 12 and outer ring 14. In the embodiments shown, the bearing elements 20 are balls bearings, but it is understood that other types of bearing elements can alternately be used, such as for example roller bearings and tapered bearings. The cage member 22 is received between the inner and outer rings 12, 14 and equally spaces the bearing elements 20 apart such that each bearing element 20 rotates around the inner and outer races without contacting the other bearing elements 20. In an embodiment, a given cage member 22 includes a proximal land 22A adjacent the proximal inner ring 12A and a distal land 22B adjacent the distal inner ring 12B.

Referring more particularly to FIGS. 1 and 2, the outer ring 14 has a ring body that is centered on a central axis X of the bearing assembly 10, with the outer race being defined on an inner surface thereof around its circumference. For example, the outer ring 14 may define an annular torus portion to accommodate the bearing elements 20. Although not shown in FIG. 2, the inner surface may be at the same diameter as the outer race. The inner ring assembly 12 may also be centered on the central axis X of the bearing assembly 10, with the inner race being defined on an outer surface thereof around its circumference. An oil gallery 24 may be defined at an exterior of the proximal inner ring 12A. An exemplary shape is shown for the outer ring 14, and is one among others. For example, the outer shape may be a cylinder.

Referring to FIG. 2, the inner circumferential surface 30 of the inner ring assembly 12 includes a plurality of axial slots 32 and a central circumferential slot 34 defined therein. In the figures, the axial slots 32 may be shown as 32A and 32B (concurrently referred to as 32), the "A" indicating that the axial slots 32A are proximal axial slots as they are defined in the proximal inner ring 12A, the "B" indicating that the axial slots 32B are distal axial slots as they are defined in the distal inner ring 12B. The central circumferential slot 34 may extend about the full circumference of the inner circumferential surface 30 (i.e., is continuous over 360 degrees). The central circumferential slot 34 may be less than 360 degrees as well. However, as a single unit, the central circumferential slot 34 is in fluid communication with each of the axial slots 32. The central circumferential slot 34 may be located at a junction or meeting plane between the proximal inner ring 12A and the distal inner ring 12B, and may consist of a proximal central circumferential slot portion in the proximal inner ring 12A and a distal central circumferential slot portion in the distal inner ring 12B. The central circumferential slot 34 may alternatively be entirely located in either one of the inner rings 12A or 12B.

The proximal axial slots 32A extend along the axial direction of the bearing assembly 10, and are circumferentially spaced apart in the proximal portion of the inner circumferential surface 30 (e.g., the part 30A of the surface in the proximal inner ring 12A). In various embodiments, the proximal axial slots 32A may be equidistantly spaced apart around the circumference of the proximal inner ring 12A, although a non-equidistant spacing pattern may also be used. Each axial slot 32A extends straight across the inner surface 30 from a first axial face 36 of the inner ring assembly 12 to the circumferential slot 34. In an embodiment, a depth of the proximal axial slots 32A may increase (e.g., linearly) from the proximal axial face 36 to the circumferential slot 34, to assist in moving lubricant axially along the proximal slots 32A.

One or more distal axial slots 32B extend as well along the axial direction of the bearing assembly 10, and may be circumferentially spaced apart in the distal portion 30B of the inner circumferential surface 30 (e.g., the part of the surface 30 in the distal inner ring 12B). In various embodiments, the distal axial slot(s) 32B may be equidistantly spaced apart around the circumference of the proximal inner ring 12B, although a non-equidistant spacing pattern may also be used. Referring additionally to FIG. 3, each distal axial slot 32B extends straight across the distal inner surface 30B from the circumferential slot 34 to a distal circumferential slot 40 adjacent a second axial face 38 of the inner ring assembly 12, as will be discussed in further detail below. Again, in an embodiment a depth of the distal axial slot(s) 32B may increase from the central circumferential slot 34 towards the distal circumferential slot 40, to assist in moving lubricant axially along the slot(s) 32B. The depth of the distal axial slot(s) 32B at the junction with the circumferential slot 34 may be greater than the depth of the circumferential slot 34, or may be equal but with the depth of the distal axial slot(s) 32B increasing axially as described above, to create a cascade effect. In various embodiments, the inner ring 12 can be a split inner ring 12 having a proximal inner ring 12A and distal inner ring 12B, as described above, or may be a singular inner ring 12. In such embodiments, distal axial slot(s) 32B would extend from a first axial end to a second axial end. It is to be understood that in various embodiments, the term first axial end may refer to the first axial face 36 in the case of a singular inner ring 12 or an edge of the central circumferential slot 34 adjacent the distal inner ring 12B in the case of a split inner ring 12.

According to an embodiment, the inner ring assembly 12 may have an equal number of proximal axial slots 32A and of distal axial slots 32B. According to another embodiment, the circumferential spacing or circumferential spacing pattern between the proximal axial slots 32A is equal to that between the distal axial slots 32B. According to another embodiment, the inner ring assembly 12 has an equal number of proximal axial slots 32A and of distal axial slots 32B and the circumferential spacing or circumferential spacing pattern is the same as well.

Referring to FIGS. 2 and 3, the inner ring 12 also includes a plurality of radial passages 44, 46 defined therethrough (a.k.a., channels, throughbores, holes, etc). The radial passages concurrently referred to as 44 are shown as 44A and 44B in the Figs., the "A" indicating that the passages 44A are proximal passages as they are defined in the proximal inner ring 12A, the "B" indicating that the passages 44B are distal passages as they are defined in the distal inner ring 12B and in fluid communication with the distal circumferential slot 40, as will be discussed below. The radial passages 46 are central passages as they extend into the inner ring assembly 12 from the central circumferential slot 34.

The proximal/distal passages 44 are defined as shoulder radial passages, whereas the central passages 46 are race radial passages (a.k.a., middle groove). For example, the shoulder radial passages 44 feed the lubricating fluid to the cage 22 piloting surface at shoulders of the inner ring assembly 12 in the roller volume, illustratively to proximal land 22A and to distal land 22B, whereas the race radial passages 46 extend through the inner ring assembly 12 to the inner race. The race radial passages 46 may provide lubricating fluid directly to the bearing element 20 and the inner race contact interface. In an embodiment, the central passages 46 are defined in the inner ring 12A and are located at ends of the axial slots 32A. The number of proximal radial passages 44A, distal radial passages 44B and central radial passages 46 may vary, as well as their arrangements and ratios amongst themselves. The axial slots 32, central circumferential slot 34, distal circumferential slot 40 and radial passages 44, 46 function together as a series of fluid passages to deliver lubricating fluid to the bearing assembly 10 such that the bearing assembly 10 is lubricated proximally, centrally and distally. In an embodiment, once the inner ring 12 has been mounted to a shaft 50, lubricating fluid is circulated to the inner ring 12, for example from a radial scoop or an axial scoop depending on the space available for the bearing assembly, via the gallery 24.

While FIG. 3 shows a distal inner ring 12B with one visible distal axial slot 32B and one visible distal radial passage 44B (others may be present), it is to be understood that the present disclosure is not limited to such an embodiment and distal inner rings 12B with varying numbers of distal axial slots 32B and distal radial passages 44B are considered. For simplicity, the embodiment of FIG. 3 will be described herein. As shown in FIG. 3, the distal radial passage 44B is circumferentially offset from the distal axial slot 32B. By circumferentially offset, it is implied that when viewing the distal inner ring 12B along axis X passing through its center C, a greater-than-zero angle would exist between the distal axial slot 32B and the distal radial passage 44B. Stated differently, if the position of the radial slot 32B and of the radial passage 44B are projected onto a plane to which the axis X is normal, the angular position of the slot 32B and slot 44B would be at different positions along a circle that would represent the circumferential slot 40, and would be separated by an angle relative to a center (representing axis X). Such separation may lead to reduced stresses acting upon the distal inner ring 12B when in use, which may allow for increased operating conditions and the use of alternate bearing materials. In embodiments having a plurality of distal axial slots 32B and distal radial passages 44B, each distal radial passage 44B would be spaced around the distal circumferential slot 40 and circumferentially offset from each distal axial slot 32B. In such embodiments, the spacing between the distal radial passages 44B may be uniform or non-uniform, and the distal radial passages 44B may be fully or partially interspersed around the circumference of the distal circumferential slot 40. In other embodiments having a plurality of distal axial slots 32B and distal radial passages 44B, at least one distal radial passage 44B is circumferentially offset from each distal axial slot 32B. In various embodiments, the distal circumferential slot 40 may extend about the full circumference of the distal inner circumferential surface 30B (i.e., is continuous over 360 degrees). The distal circumferential slot 40 may be less than 360 degrees as well, for example in a distal inner ring 12B that includes distal axial slots 32B that are not fully circumferentially spaced (i.e., less than 360 degrees) around the distal inner circumferential surface 30B. In the embodiment shown in FIG. 3, the distal circumferential slot 40 is bounded on one side by a sidewall 48 extending upward towards the distal inner circumferential surface 30B, while the other side is unbounded where it meets the second axial face 38. In another embodiment, the distal circumferential slot 40 may include a second sidewall (sidewall) acting as a barrier between it and the second axial face 38, for example to prevent lubricating fluid from flowing over the second axial face 38.

In an embodiment, the present disclosure teaches a method for lubricating the bearing assembly 10 as described above. A lubricating fluid (not shown) is fed to the one or more distal axial slots 32B extending axially along the distal inner circumferential surface 30B of the distal inner ring 12B of the bearing assembly 10 from a respective opening (not shown) in a first axial face 36 of the inner ring 12. Then, the lubricating fluid is directed into the distal circumferential slot 40 disposed in the distal inner circumferential surface 30B adjacent a second axial face 38 of the inner ring 12. Then, at least a portion of the lubricating fluid is circumferentially diverted into one or more distal radial passages 44B disposed within the inner ring 12 and in fluid communication with the distal circumferential slot 40. As discussed above, at least one distal radial passage 44B is circumferentially offset from each distal axial slot(s) 32B.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An inner ring for a bearing assembly, comprising:
    an inner circumferential surface disposed between a first axial end and a second axial end;
    a circumferential slot disposed in the inner circumferential surface adjacent the second axial end;
    at least one radial passage disposed within the inner ring and in fluid communication with the circumferential slot, the at least one radial passage having an inlet disposed within the circumferential slot; and
    at least one axial slot extending axially along the inner circumferential surface from a respective opening in the first axial end to the circumferential slot;
    wherein each at least one radial passage is circumferentially offset from each at least one axial slot.

2. The inner ring as defined in claim 1, wherein the circumferential slot is continuous over 360 degrees.

3. The inner ring as defined in claim 1, wherein a plurality of the at least one axial slot are evenly spaced about the entire inner circumferential surface.

4. The inner ring as defined in claim 1, wherein a plurality of the at least one axial slot are equidistantly spaced apart.

5. The inner ring as defined in claim 1, wherein a depth of the at least one axial slot increases towards the circumferential slot.

6. The inner ring as defined in claim 1, wherein the circumferential slot includes a sidewall extending upward towards the inner circumferential surface and is open towards the second axial end.

7. The inner ring as defined in claim 1, wherein the bearing assembly is a ball bearing assembly.

8. A method of lubricating a bearing assembly, comprising:
    feeding a lubricating fluid to at least one axial slot extending axially along an inner circumferential surface of an inner ring of the bearing assembly from a respective opening in a first axial end of the inner ring;
    directing the lubricating fluid to a circumferential slot disposed in the inner circumferential surface adjacent a second axial end of the inner ring; and
    circumferentially diverting at least a portion of the lubricating fluid into at least one radial passage disposed within the inner ring such that each at least one radial passage is circumferentially offset from each at least one axial slot, the at least one radial passage having an inlet disposed within the circumferential slot.

9. The method as defined in claim 8, wherein the bearing assembly is a ball bearing assembly.

10. The method as defined in claim 8, wherein circumferentially diverting at least a portion of the lubricating fluid further comprises feeding the diverted lubricating fluid to a roller volume of the bearing assembly.

11. A bearing assembly comprising:
    an outer ring defining a central axis of rotation for the bearing assembly;
    an inner ring assembly disposed radially inwardly of the outer ring and cooperating therewith to form a roller volume, the inner ring assembly having a proximal inner ring, a distal inner ring, and a central circumferential slot in an inner circumferential surface of the inner ring assembly, the central circumferential slot being in fluid communication with the roller volume through central radial passages in the inner ring assembly, the proximal inner ring including proximal axial slots formed in, extending axially along and circumferentially spaced around a proximal portion of the inner circumferential surface, the proximal axial slots extending axially from openings in an axial face of the proximal inner ring to the central circumferential slot defined in the inner circumferential surface, at least one of the proximal axial slots being in fluid communication with the roller volume through a respective proximal radial passage in the proximal inner ring, and the distal inner ring including at least one distal axial slot formed in, extending axially along and circumferentially spaced around a distal portion of the inner circumferential surface, the distal inner ring further including a distal circumferential slot at a distal edge thereof, the distal circumferential slot being in fluid communication with the roller volume through at least one distal radial passage disposed in the distal inner ring, the at least one distal axial slot extending axially from the central circumferential slot to the distal circumferential slot, wherein at least one of the distal radial passage is circumferentially offset from each at least one distal axial slot; and bearing elements in the roller volume rollingly disposed against an inner circumferential surface of the outer ring and an outer circumferential surface of the inner ring, the bearing elements allowing relative rotational motion between the outer ring and the inner ring.

12. The bearing assembly according to claim 11, wherein the central circumferential slot is concurrently defined by a central circumferential slot portion in the proximal inner ring and another central circumferential slot portion in the distal inner ring.

13. The bearing assembly according to claim 11, wherein the at least one distal axial slot extends from the central circumferential slot to the distal circumferential slot.

14. The bearing assembly according to claim 11, wherein a number of proximal axial slots is equal to a number of the at least one distal axial slot.

15. The bearing assembly according to claim 11, wherein the central circumferential slot is continuous over 360 degrees.

16. The bearing assembly according to claim 11, wherein the distal circumferential slot is continuous over 360 degrees.

17. The bearing assembly according to claim 11, wherein a depth of the at least one distal axial slot increases from the central circumferential slot towards the distal circumferential slot.

18. The bearing assembly according to claim 11, wherein the bearing elements are ball bearing elements.

19. The bearing assembly according to claim 11, wherein the bearing elements are cylindrical roller bearing elements.

20. The bearing assembly according to claim 11, wherein the bearing elements are tapered bearing elements.

\* \* \* \* \*